(12) United States Patent
Ueda et al.

(10) Patent No.: US 6,213,374 B1
(45) Date of Patent: Apr. 10, 2001

(54) FEEDER OF WIRE SOLDER

(75) Inventors: Masayoshi Ueda, Nishinomiya; Moriaki Kawasaki, Suita, both of (JP)

(73) Assignee: Matsushita Electric Industrial Co., Ltd., Kadoma (JP)

( * ) Notice: Subject to any disclaimer, the term of this patent is extended or adjusted under 35 U.S.C. 154(b) by 0 days.

(21) Appl. No.: 09/299,003

(22) Filed: Apr. 26, 1999

(30) Foreign Application Priority Data

Apr. 27, 1998 (JP) ................................................. 10-116756

(51) Int. Cl.$^7$ ................................ B23K 1/00; B23K 5/00
(52) U.S. Cl. .................................. 228/41; 228/8; 228/11
(58) Field of Search ............................ 228/41, 8, 11; 29/DIG. 23

(56) References Cited

U.S. PATENT DOCUMENTS

| | | | | |
|---|---|---|---|---|
| 3,830,420 | * | 8/1974 | Milana et al. | 228/9 |
| 4,268,739 | * | 5/1981 | Evans | 219/56.1 |
| 5,526,975 | * | 6/1996 | Endo | 228/103 |
| 5,813,591 | * | 9/1998 | Quinn et al. | 228/41 |
| 5,839,642 | * | 11/1998 | Tait | 228/41 |
| 5,975,403 | * | 1/1999 | Ueda et al. | 228/8 |
| 6,027,068 | * | 2/2000 | Lantsman | 242/564.4 |

* cited by examiner

Primary Examiner—Geoffrey S. Evans
Assistant Examiner—L. Edmondson
(74) Attorney, Agent, or Firm—Wenderoth, Lind & Ponack, L.L.P.

(57) ABSTRACT

Beads or ridges formed by metal work such as knurling provide peaks and valleys on a shaft of a rotary disc, which is part of an abnormal detector of wire solder, so that frictional force between the wire solder is strengthened. Further, the same peaks and valleys mating with those on the shaft are provided on a surface of a feeding roller of the wire solder. The wire solder fed by the feeding roller is provided with the peaks and valleys due to plastic deformation. Both the peaks and valleys on the shaft and on the wire-solder mate with each other so that slipping therebetween can be prevented. Since the shaft is integrated with the rotary disc which is part of the abnormal detector, the accuracy of detecting abnormalities such as clogging wire-solder or crimped wire-solder can be improved. As a result, a feeder of wire solder with better accuracy in abnormality detection can be realized.

11 Claims, 4 Drawing Sheets

FEEDER OF WIRE SOLDER

FIELD OF THE INVENTION

The present invention relates to a feeder of wire solder used for soldering electronic components.

BACKGROUND OF THE INVENTION

A light beam heating apparatus which heats up a local spot without touching the local spot is widely used for soldering small size electronic components. Wire solder or cream solder is used in general when the light beam heating apparatus is employed. A conventional feeder of wire solder employed in a soldering machine is described with reference to FIG. 4A and FIG. 4B.

FIG. 4A shows an entire structure of the conventional feeder, and FIG. 4B shows an essential part thereof.

In this conventional feeder of wire solder, wire solder detector 2 monitors whether wire solder 1 travels to feeding roller 3 normally free from discontinuation, and then roller 3 feeds wire solder 1 into guide tube 7a. Part of guide tube 7a is cut away, and wire solder 1 is exposed therefrom. The exposed wire solder 1 contacts shaft 5a of rotary disc 4a. The travel of wire solder 1 drives shaft 5a, which is integrated with disc 4a, and then disc 4a also rotates. The rotation of disc 4a is converted into a detection signal by rotation sensor 4b. This electric signal is sent to feeding controller 6, which sends a rotation instructing signal to a motor 9 that drives feeding roller 3.

When wire solder 1 normally travels, the detection signal by sensor 4b synchronizes with the rotation instructing signal supplied to motor 9. When wire solder 1 is at a normal halt status, the detection signal also synchronizes with the rotation instructing signal. Feeder controller 6 determines whether wire solder is normally fed or at a halt by comparing and calculating the rotation instructing signal and the detection signal converted by sensor 4b. If some abnormality occurs in the feeding of wire solder 1, the two signals do not synchronize with each other. Then controller 6 determines that some abnormality has occurred in the feeding, and immediately stops sending the rotation instructing signal to motor 9. After passing through guide tube 7a, wire solder 1 travels into feeding-direction-fine-adjuster 8 via feeding tube 7. Adjuster 8 adjusts a feeding direction of wire solder 1, which is then sent to a precise location requiring the soldering.

The conventional feeder, however, has the following problem. In the conventional feeder, the shaft 5a of rotary disc 4a directly contacts wire solder 1, so that the feeding condition of wire solder is detected. The rotational accuracy of disc 4a depends on the friction factor between wire solder 1 and the shaft 5a. The friction factor is determined by the material of wire solder 1 and the material of the shaft 5a. Therefore, wire solder 1 tends to slip on the shaft 5a, which often misleads the controller 6 in determining to stop feeding of the wire solder 1, even though it is normally fed.

SUMMARY OF THE INVENTION

The present invention addresses the problem discussed above and aims to provide a feeder of wire solder in which slip between the wire solder and a rotary disc is prevented so that the accuracy of detecting abnormalities such as clogging wire-solder, crimped wire-solder and the like can be improved. It is thus expected that the feeding of the wire solder can be monitored with more accuracy.

To realize the object discussed above, one mode of the feeder of wire solder of the present invention includes a rotary disc, at least part of which contacts the wire solder being fed, and the rotary disc rotates following the travelling of the wire solder. Material which boosts the friction factor between the rotary disc and the wire solder is provided on the contact part of the disc.

To further realize the object discussed above, another mode of the feeder of the present invention includes a rotary disc, at least part of which contacts the wire solder being fed, and the rotary disc rotates following the travelling of the wire solder. Peaks and valleys are provided in the contact section of the rotary disc.

To further realize the object discussed above, still another mode of the feeder of the present invention includes a feeding roller for feeding a wire solder and a rotary disc, at least part of which contacts the wire solder being fed, and the rotary disc rotates following the traveling of the wire solder. Peaks and valleys are provided in the contact section of the rotary disc. Further, peaks and valleys which mate with those on the rotary disc are provided on a contact part of the wire solder of the feeding roller.

The feeder of wire solder having one of the constructions discussed above can increase the friction factor between the wire solder and the rotary disc so that slip therebetween can be prevented. As a result, abnormalities in the feeding can be accurately detected, thereby remarkably improving the efficiency of soldering work.

DESCRIPTION OF THE PREFERRED EMBODIMENTS

Figure 4A:
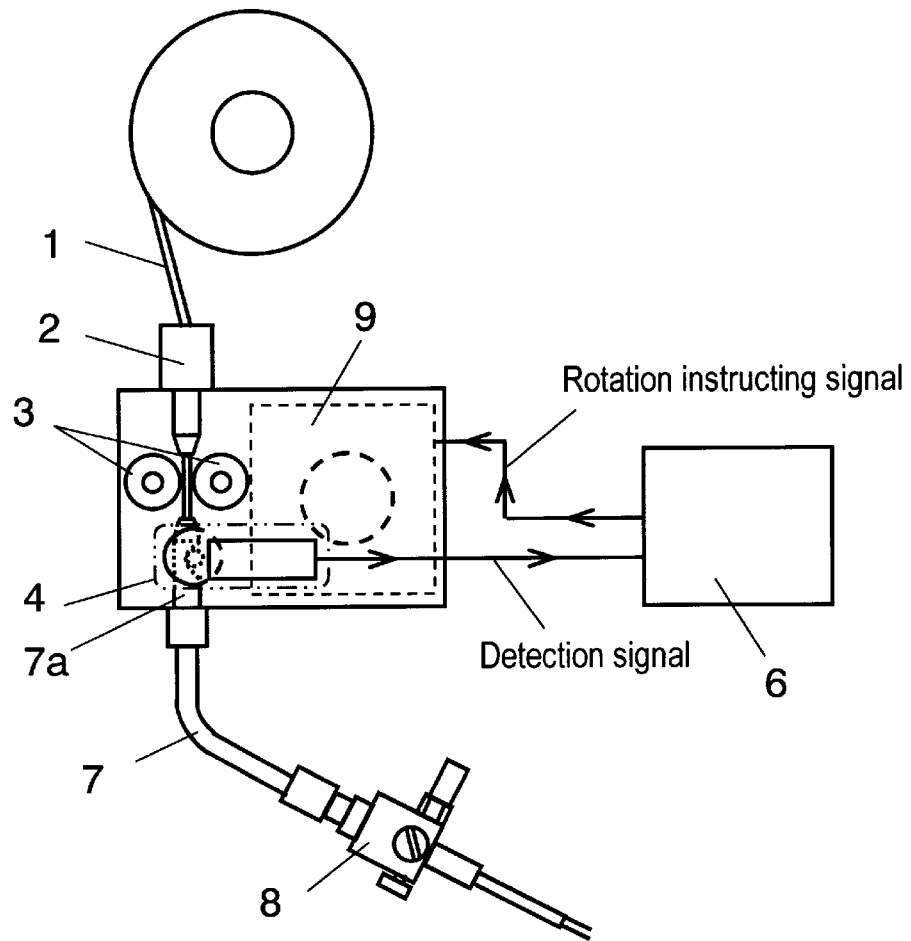
FIG. 4A illustrates a perspective view showing an essential part of a conventional feeder of wire solder.
Figure 4B:
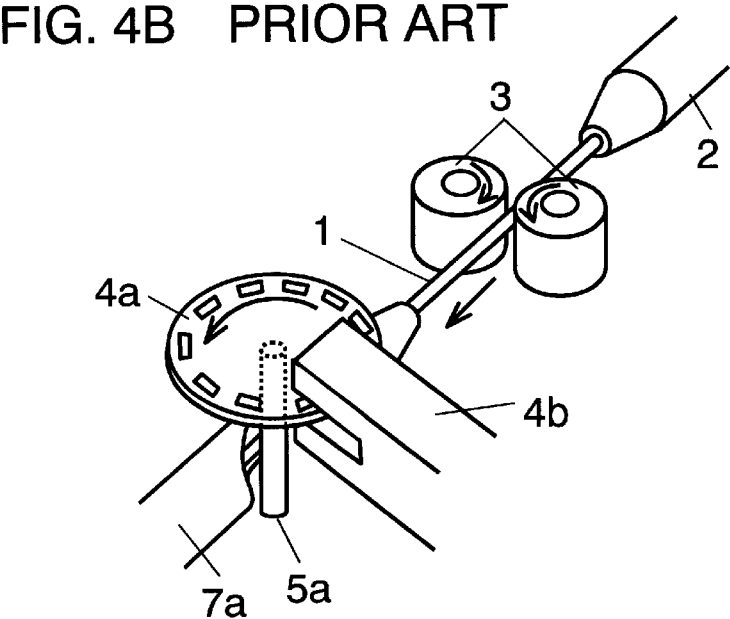
FIG. 4B illustrates in detail a shaft of a disc employed in the conventional feeder shown in FIG. 4A.

A basic construction of a wire-solder-feeder of the present invention is the same as that of the conventional feeder, which is shown in FIG. 4A. The detailed description of structure is thus omitted.

(Exemplary Embodiment 1)

Figure 1A:
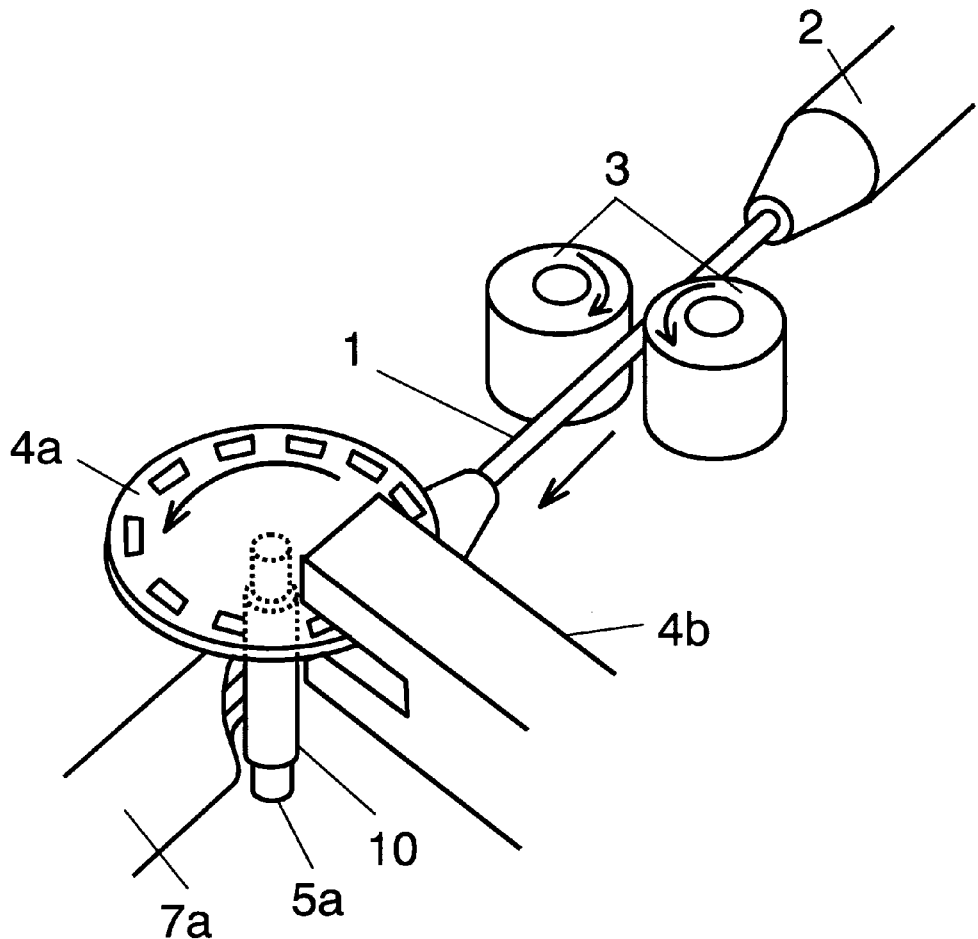
FIG. 1A is a perspective view showing an essential part of a feeder of wire solder in accordance with a first exemplary embodiment of the present invention.
Figure 1B:
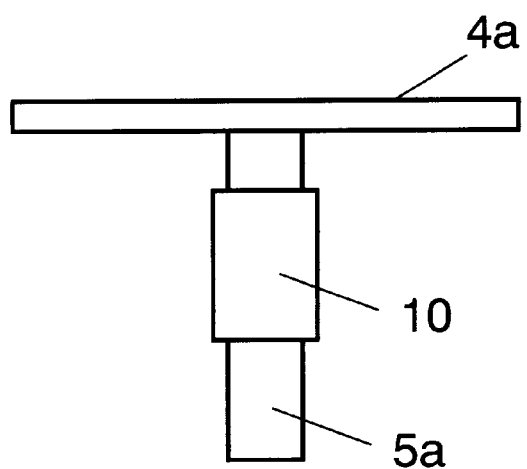
FIG. 1B illustrates in detail a shaft of a disc employed in the feeder shown in FIG. 1A.

FIG. 1A is a perspective view showing an essential part of a first exemplary embodiment of the present invention. Wire solder 1 is fed into feeding roller 3 via wire solder detector 2, which detects discontinuation of the wire solder. Then roller 3 drives wire solder 1 into guide tube 7a. Part of tube 7a is cut away and wire solder 1 is exposed therefrom. The exposed wire solder is contacted by shaft 5a of rotary disc 4a where shaft 5a is covered by material 10 having a great friction factor with wire solder 1, as shown in FIG. 1B. The feeding of wire solder 1 gives a rotating force to shaft 5a at the contact part, which also rotates disc 4a. Since shaft 5a is covered by material 10, having a great friction factor with the wire solder 1, shaft 5a rotates free from slippage on wire solder 1.

Rotary disc 4a, integrating shaft 5a, thus rotates at the same speed as the wire solder 1 is fed. The rotation of disc 4a is converted into an electric signal by rotation sensor 4b, and the electric signal is then sent to feeding controller 6 shown in FIG. 4A, which sends a rotation instructing signal to motor 9, shown in FIG. 4A, that drives feeding roller 3. When wire solder 1 normally travels, the detection signal by sensor 4b synchronizes with the rotation instructing signal supplied to motor 9. When wire solder 1 is at a normal halt status, the detection signal also synchronizes with the rotation instructing signal.

Feeder controller 6 determines whether wire solder is normally fed or at a halt by comparing and calculating the rotation instructing signal and the detection signal converted by sensor 4b. If some abnormality occurs, the two signals do not synchronize with each other. Controller 6 then determines whether some abnormality occurs in the feeding, and immediately stops sending the rotation instructing signal to motor 9.

After passing through guide tube 7a, wire solder 1 travels into feeding-direction-fine-adjuster 8 via feeding tube 7. Adjuster 8 adjusts a feeding direction of the wire solder 1, which is then sent to a precise location requiring the soldering.

As such, according to the first exemplary embodiment of the present invention, shaft 5a of rotary disc 4a, which is part of abnormal detector 4, is covered by the material 10, such as a rubber tube, having a friction factor that is great with wire solder 1. The frictional force with the wire solder is thus increased, and slippage therebetween is prevented. As a result, abnormal feeding of wire solder can be accurately detected. Clogging wire-solder or crimped wire-solder can be detected with better accuracy, which can remarkably increase the efficiency of soldering work.

(Exemplary Embodiment 2)

Figure 2A:
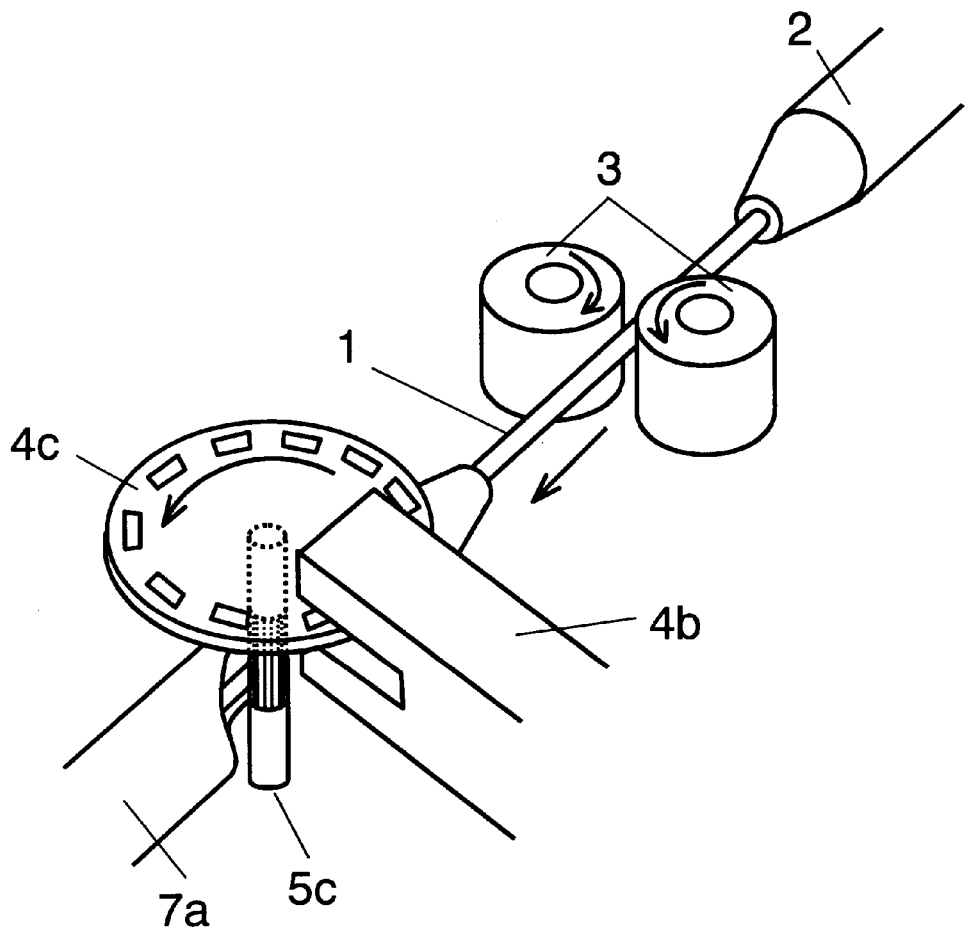
FIG. 2A is a perspective view showing an essential part of a feeder of wire solder in accordance with a second exemplary embodiment of the present invention.
Figure 2B:
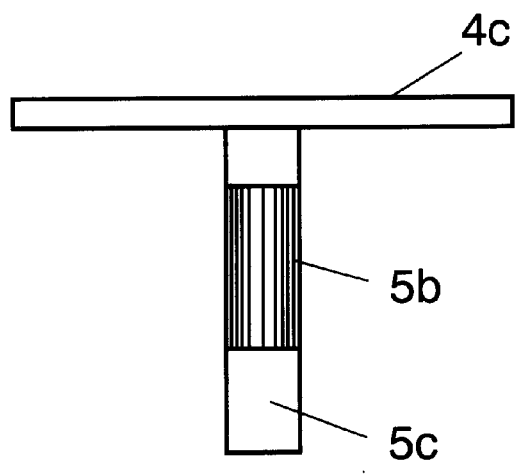
FIG. 2B illustrates in detail a shaft of a disc employed in the feeder shown in FIG. 2A.

FIG. 2A is a perspective view showing an essential part of a second exemplary embodiment of the present invention. Instead of covering a shaft 5a with material 10 having a great friction factor with wire solder 1, a shaft 5c has a surface 5b provided with beads or ridges by metal work such as knurling, as shown in FIG. 2B.

Wire solder 1 is fed into feeding roller 3 via wire solder detector 2, which detects discontinuation of the wire solder. Then roller 3 drives wire solder 1 into guide tube 7a. Part of tube 7a is cut away and wire solder 1 is exposed therefrom. The exposed wire is contacted with the surface 5b of shaft 5c of rotary disc 4c, where the beads or ridges in metal work by knurling are provided on the surface 5b. The surface 5b of shaft 5c thus has peaks and valleys. The friction between the shaft 5c and wire solder 1 is thus substantially great. When wire solder 1 is fed, shaft 5c is driven at the contact part and rotates free from slippage on wire solder 1. Rotary disc 4c is thus rotated at the same speed as the feeding speed of wire solder 1.

The rotation of disc 4c is converted into an electric signal by rotation sensor 4b, and the electric signal is then sent to feeding controller 6, which sends a rotation instructing signal to motor 9 that drives feeding roller 3. When wire solder 1 normally travels, the detection signal by sensor 4b synchronizes with the rotation instructing signal supplied to motor 9. When wire solder 1 is at a normal halt status, the detection signal also synchronizes with the rotation instructing signal. Feeder controller 6 determines whether wire solder is normally fed or at a halt by comparing and calculating the rotation instructing signal and the detection signal converted by sensor 4b. If some abnormality occurs, the two signals do not synchronize with each other. Then controller 6 determines that some abnormality has occurred in feeding, and immediately stops sending the rotation instructing signal to motor 9.

After passing through guide tube 7a, wire solder 1 travels into feeding-direction-fine-adjuster 8 via feeding tube 7. Adjuster 8 adjusts a feeding direction of wire solder 1, which is then sent to a precise location requiring the soldering.

As such, according to the second exemplary embodiment, since shaft 5c of rotary disc 4c, which is part of abnormal detector 4, has peaks and valleys on its surface 5b due to knurling, the friction force between the shaft and the wire solder is substantially great. Shaft 5c of rotary disc 4c rotates following the feed of wire solder 1 free from slippage. The part of shaft 5c that has undergone the knurling can be made of a material such as hard rubber having a great friction factor with wire solder 1, thereby further enhancing the effect.

As a result, in the feeder of wire solder in accordance with the second exemplary embodiment of the present invention, abnormal feeding of wire solder can be accurately detected. Clogging wire-solder or crimped wire-solder can be detected with better accuracy, which can remarkably increase the efficiency of soldering work.

(Exemplary Embodiment 3)

Figure 3A:
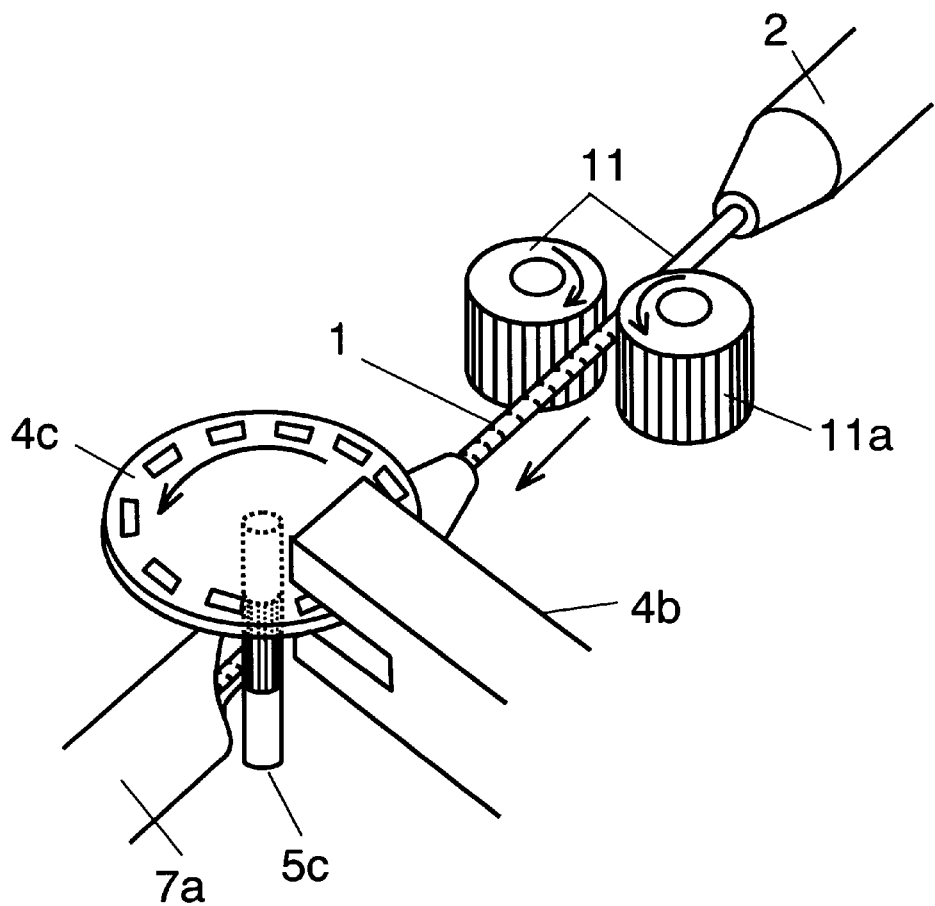
FIG. 3A is a perspective view showing an essential part of a feeder of wire solder in accordance with a third exemplary embodiment of the present invention.
Figure 3B:
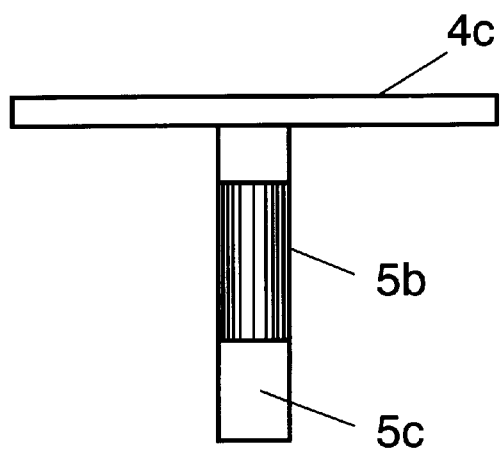
FIG. 3B illustrates in detail a shaft of a disc employed in the feeder shown in FIG. 3A.

FIG. 3A is a perspective view showing an essential part of a third exemplary embodiment of the present invention. In this third exemplary embodiment, beads or ridges formed by metal work such as knurling are provided on the surface 5b of shaft 5c of rotary disc 4c, as shown in FIG. 3B. Further, beads or ridges, formed by metal work such as by knurling, and which can mate with those on shaft 5c, are provided on the surface 11a of feeding roller 11. Feeding roller 11 thus forms beads or ridges on the wire solder 1.

Wire solder 1 is fed into feeding roller 11 via wire solder detector 2 which detects discontinuation of the wire solder. Peaks and valleys are formed due to beads or ridges on the surface 5b of shaft 5c and on the surface 11a of roller 11. Feeding roller 11 drives wire solder 1 into guide tube 7a. Part of tube 7a is cut away and wire solder 1 is exposed therefrom. The exposed wire contacts shaft 5c of rotary disc 4c. The friction between the shaft 5c and wire solder 1 is substantially great due to the peaks and valleys on the shaft 5c. When wire solder 1 is fed, shaft 5c is driven at the contact part and rotates free from slippage on wire solder 1. Rotary disc 4c is thus rotated at the same speed as the feeding speed of wire solder 1.

The rotation of disc 4c is converted into an electric signal by rotation sensor 4b, and the electric signal is then sent to feeding controller 6, which sends a rotation instructing signal to motor 9 that drives feeding roller 11. When wire solder 1 normally travels, the detection signal by sensor 4b synchronizes with the rotation instructing signal supplied to motor 9. When wire solder 1 is at a normal halt status, the detection signal also synchronizes with the rotation instructing signal. Feeder controller 6 determines whether wire solder is normally fed or at a halt by comparing and calculating the rotation instructing signal and the detection signal converted by sensor 4b. If some abnormality occurs, the two signals do not synchronize with each other. Then controller 6 determines that some abnormality has occurred in feeding, and immediately stops sending the rotation instructing signal to motor 9.

After passing through guide tube 7a, wire solder 1 travels into feeding-direction-fine-adjuster 8 via feeding tube 7. Adjuster 8 adjusts a feeding direction of wire solder 1, which is then sent to a precise location requiring soldering. The part shaft 5c having undergone knurling, can be made of, material such as hard rubber, having a great friction factor with wire solder 1, thereby further enhancing the effect.

As such, since shaft 5c of rotary disc 4c, which is part of abnormal detector 4, has peaks and valleys on its surface 5b due to knurling, the friction force between the shaft 5c and the wire solder 1 is substantially great. Further, in this third exemplary embodiment, the beads or ridges provided on the surface 5b of shaft 5c are also provided on the surface 11a of feeding roller 11 so that both the surfaces have peaks and valleys that can mate with each other. The surface of the wire solder 1 undergoning feeding roller 11 is provided, due to plastic deformation, with reversed peaks and valleys to those formed on the surface 11a of feeding roller 11. The peaks and valleys formed on the wire solder surface thus mate with the peaks and valleys on shaft 5c of rotary disc 4c like rack and pinion. As a result, slip between wire solder 1 and shaft 5c can be completely prevented.

As a result, in the feeder of wire solder in accordance with the third exemplary embodiment of the present invention, abnormal feeding of wire older can be accurately detected. Clogging wire-solder or crimped wire-solder can be detected with better accuracy, which can remarkably increase the efficiency of soldering work.

What is claimed is:

1. A feeder of wire solder, comprising:
    a feeding roller arrangement for feeding wire solder, said feeding roller arrangement having a feeding roller arrangement contact part for contact with the wire solder;
    a rotary disc comprising a rotary disc contact part adapted to be in contact with wire solder fed by said feeding roller arrangement and arranged such that when the wire solder is fed by said feeding roller arrangement, said rotary disc rotates along with movement of the wire solder due to contact of said rotary disc contact part with the wire solder;
    wherein said rotary disc contact part for contacting the wire solder comprises at least one of (a) a material having a high friction factor with the wire solder for engaging with the wire solder and (b) peaks and valleys for engaging with the wire solder, and
    wherein said rotary disc contact part comprises said material having a high friction factor with the wire solder; and
    a solder detector for detecting a feeding status of the wire solder based on rotations of said rotary disc.

2. The feeder of wire solder of claim 1, wherein said rotary disc contact part comprises said material having a high friction factor with the wire solder and said peaks and valleys, said peaks and valley being formed on said material having a high friction factor.

3. A feeder of wire solder, comprising:
    a feeding roller arrangement for feeding wire solder, said feeding roller arrangement having a feeding roller arrangement contact part for contact with the wire solder;
    a rotary disc comprising a rotary disc contact part adapted to be in contact with wire solder fed by said feeding roller arrangement and arranged such that when the wire solder is fed by said feeding roller arrangement, said rotary disc rotates along with movement of the wire solder due to contact of said rotary disc contact part with the wire solder,
    wherein said rotary disc contact part for contacting the wire solder comprises at least one of (a) a material having a high friction factor with the wire solder for engaging with the wire solder and (b) peaks and valleys for engaging with the wire solder,
    wherein said rotary disc contact part comprises said peaks and valleys; and
    a solder detector for detecting a feeding status of the wire solder based on rotations of said rotary disc.

4. A feeder of wire solder, comprising:
    a feeding roller arrangement for feeding wire solder, said feeding roller arrangement having a feeding roller arrangement contact part for contact with the wire solder;
    a rotary disc comprising a rotary disc contact part adapted to be in contact with wire solder fed by said feeding roller arrangement and arranged such that when the wire solder is fed by said feeding roller arrangement, said rotary disc rotates along with movement of the wire solder due to contact of said rotary disc contact part with the wire solder,
    wherein said rotary disc contact part for contacting the wire solder comprises peaks and valleys for engaging with the wire solder,
    wherein said feeding roller arrangement contact part comprises peaks and valleys for engaging with the wire solder, and
    wherein said peaks and valleys of said feeding roller arrangement contact part correspond with said peaks and valleys of said rotary disc contact part; and
    a solder detector for detecting a feeding status of the wire solder based on rotations of said rotary disc.

5. The feeder of wire solder of claim 4, wherein said rotary disc contact part comprises said material having a high friction factor with the wire solder and said peaks and valleys, said peaks and valley being formed on said material having a high friction factor.

6. A feeder of wire solder, comprising:
    a feeding roller arrangement for feeding wire solder, said feeding roller arrangement having a feeding roller arrangement contact part for contact with the wire solder; and
    a detector for detecting movement of the wire solder, said detector comprising a rotary detector disc comprising a rotary disc contact part adapted to be in contact with the wire solder fed by said feeding roller arrangement and arranged such that when the wire solder is fed by said feeding roller arrangement, said rotary disc rotates along with movement of the wire solder due to contact of said rotary disc contact part with the wire solder; and
    a feeding controller connected to said detector and said feeding roller arrangement for controlling the feeding of the wire solder by said feeding roller arrangement and detecting an abnormality in the feeding of the wire solder with said detector;
    wherein said rotary disc contact part for contacting the wire solder comprises at least one of a material having a high friction factor with the wire solder for engaging with the wire solder and peaks and valleys for engaging with the wire solder.

7. The feeder of wire solder of claim 6, wherein:
    said detector includes a rotation sensor for sensing rotation of said rotary detector disc and generating a detection signal, sent to said feeding controller, corresponding to the rotation of said rotary detector disc.

8. The feeder of wire solder of claim 7, wherein:

said feeding roller arrangement includes a motor for driving said feeding roller arrangement; and said feeding controller is connected to said motor for controlling the feed of the wire solder by said feeding roller arrangement.

9. The feeder of wire solder of claim 6, wherein:

said rotary disc contact part for contacting the wire solder comprises said peaks and valleys for engaging with the wire solder;

said feeding roller arrangement contact part comprises peaks and valleys, and is arranged such that when the wire solder is fed by said feeding roller arrangement, said peaks and valleys of said feeding roller arrangement contact part deform the wire solder to form corresponding valleys and peaks in the wire solder; and said peaks and valleys of said feeding roller arrangement contact part correspond with said peaks and valleys of said detector disc contact part such that said peaks and valleys of said detector disc contact part can engage with the valleys and peaks formed on the wire solder.

10. The feeder of wire solder of claim 6, wherein said rotary disc contact part comprises said material having a high friction factor with the wire solder.

11. The feeder of wire solder of claim 6, wherein said rotary disc contact part comprises said peaks and valleys.

\* \* \* \* \*